US012799299B2

(12) United States Patent
Anderlik et al.

(10) Patent No.: US 12,799,299 B2
(45) Date of Patent: Nov. 17, 2026

(54) COMPOSITE MATERIAL BASED ON PERFLUOROALKOXY POLYMERS FOR COATING METALLIC SURFACES

(71) Applicant: BASF SE, Ludwigshafen am Rhein (DE)

(72) Inventors: Rainer Anderlik, Ludwigshafen (DE); Peter Dillmann, Ludwigshafen (DE); Thomas Maas, Ludwigshafen (DE); Stephan Hueffer, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 1117 days.

(21) Appl. No.: 17/759,950

(22) PCT Filed: Aug. 6, 2021

(86) PCT No.: PCT/EP2021/071985
§ 371 (c)(1),
(2) Date: Aug. 2, 2022

(87) PCT Pub. No.: WO2022/037970
PCT Pub. Date: Feb. 24, 2022

(65) Prior Publication Data

US 2023/0060987 A1 Mar. 2, 2023

(30) Foreign Application Priority Data

Aug. 17, 2020 (EP) .................................... 20191341

(51) Int. Cl.
*C08K 3/04* (2006.01)
*C08K 5/05* (2006.01)
(Continued)

(52) U.S. Cl.
CPC ................ *C08K 3/041* (2017.05); *C08K 5/05* (2013.01); *C09D 7/61* (2018.01); *C09D 127/12* (2013.01)

(58) Field of Classification Search
CPC . C08K 3/041; C08K 5/05; C08K 3/04; C09D 7/61; C09D 127/12; C09D 5/00; C09D 5/033; C09D 127/18
See application file for complete search history.

(56) References Cited

U.S. PATENT DOCUMENTS

2020/0155423 A1 * 5/2020 Ito .......................... A61K 8/345

FOREIGN PATENT DOCUMENTS

CN 109439081 A 3/2019
JP 2020024880 A 2/2020
(Continued)

OTHER PUBLICATIONS

International Search Report and Written Opinion for corresponding PCT/EP2021/071985 mailed Sep. 20, 2021; 9 pages.
(Continued)

*Primary Examiner* — Andrew J. Oyer
*Assistant Examiner* — Cullen L G Davidson
(74) *Attorney, Agent, or Firm* — Armstrong Teasdale LLP

(57) ABSTRACT

Described herein is a composite material including perfluoroalkoxy polymer powder, carbon black powder and a film-forming liquid, where the proportion by mass of the film-forming liquid is from 0.05% by weight to 1.0% by weight, the film-forming liquid at least partially wets the surfaces of the particles of the perfluoroalkoxy polymer powder, and the particles of the carbon black powder adhere to the film-forming liquid and/or the particles of the perfluoroalkoxy polymer powder. Also described herein are a
(Continued)

production process for coating metallic surfaces, which uses the composite material as starting material, and further uses of the composite material.

15 Claims, 1 Drawing Sheet

(51) Int. Cl.
*C09D 7/61* (2018.01)
*C09D 127/12* (2006.01)

(56) References Cited

FOREIGN PATENT DOCUMENTS

| | | | |
|---|---|---|---|
| KR | 101950096 | B1 | 2/2019 |
| WO | 2009020499 | A1 | 2/2009 |
| WO | 2014012161 | A1 | 1/2014 |

OTHER PUBLICATIONS

European Search Report for EP Patent Application No. 20191341.5, Issued on Feb. 12, 2021, 3 pages.

* cited by examiner

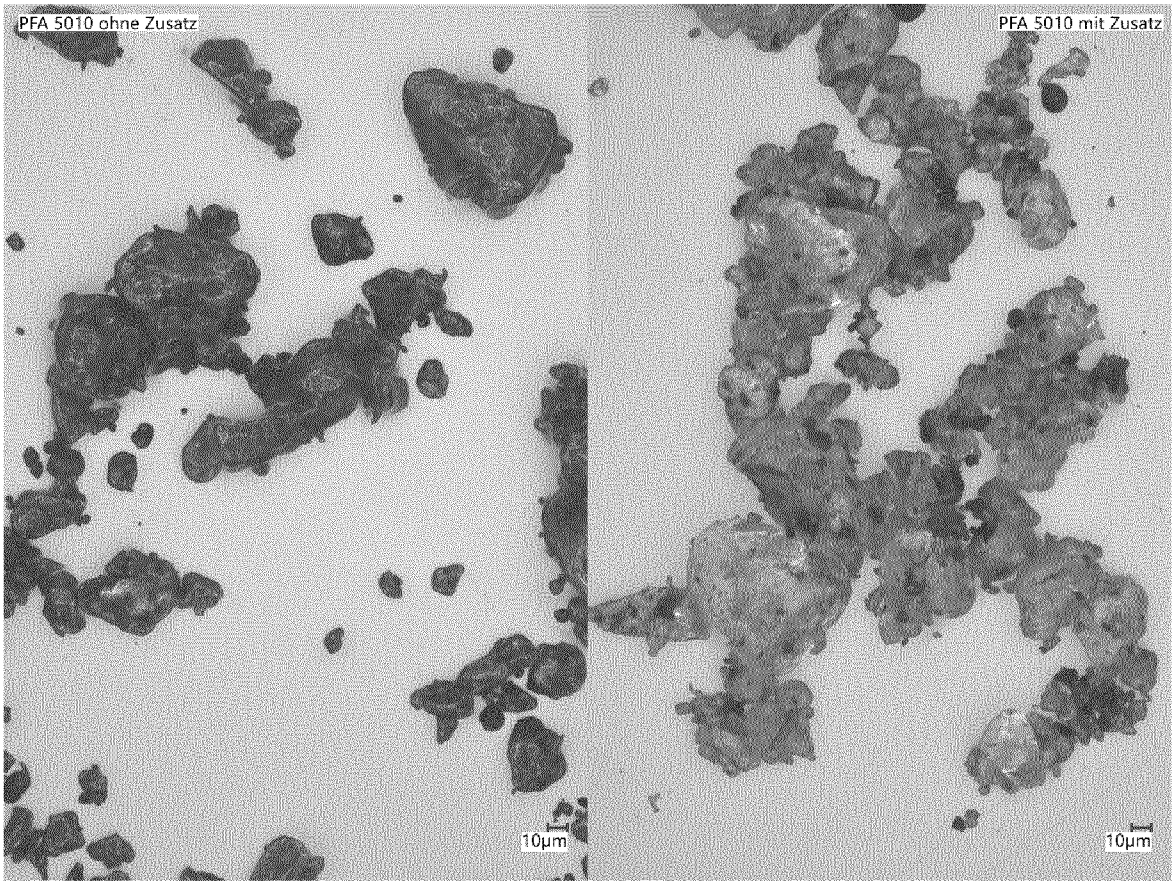
PFA 5010 ohne Zusatz
10μm
PFA 5010 mit Zusatz
10μm

COMPOSITE MATERIAL BASED ON PERFLUOROALKOXY POLYMERS FOR COATING METALLIC SURFACES

CROSS-REFERENCE TO RELATED APPLICATIONS

This application is a U.S. National Phase Application of PCT/EP2021/071985, filed Aug. 6, 2021, which claims the benefit of priority to European Patent Application No. 20191341.5, filed Aug. 17, 2020, the entire contents of which are hereby incorporated by reference herein.

DESCRIPTION

The present invention relates to a composite material comprising perfluoroalkoxy polymer powder, carbon black powder and a film-forming liquid. Furthermore, the invention relates to a production process for coating metallic surfaces, which uses the composite material as starting material, and also further uses of the composite material.

Composite materials for coating metallic surfaces of components to afford corrosion protection are known from the prior art. A standard coating method is based on the electrostatic powder spray process (EPS) in which pulverulent, electrostatically charged polymer powder or composite material is sprayed by means of at least one spray gun onto the electrically grounded surface of the component to be coated. The EPS process is described, inter alia, in the following literature references: "Industrielle Pulverbeschichtung" by Judith Pietschmann, 5th edition, 2019, Springer Fachmedien Wiesbaden GmbH and "Verfahren in der Beschichtungs- and Ober-flächentechnik" by Hansgeorg Hofmann and Jürgen Spindler, 4th edition, 2020, Carl Hanser Verlag.

Owing to electrostatic forces, the composite material is attracted by the grounded metal surface. Exposure of components which have been coated in this way to temperatures above the melting point of the composite material used results in the individual particles of the fluoropolymer powder melting and forming a polymeric coating on the component. If the component is subsequently cooled to a temperature below the melting point of the fluoropolymer used, the coating accordingly solidifies in the cooling phase.

Most thermoplastic polymer powders are electrically nonconductive and can be electrostatically charged in the EPS process. However, if polymer layers which can conduct electricity away are produced in the EPS process, additional technical precautions have to be undertaken. For some thermoplastic layers which can conduct electricity away, appropriate processes are known.

In a first process known in industrial practice, mixtures of industrial blacks with polymer powders are used. Such mixtures are obtainable, for example, from Cabot Corporation, Alpharetta GA 30022, U.S.A. The mixture obtained is then applied to a metal component to be coated in the EPS process, so that black-colored layers can be formed due to the presence of the particles of the carbon black powder. Depending on the polymer/carbon black mixture, layers capable of conducting electricity away can also be formed. This process has a number of restrictions and technical limitations. These arise, in particular, from the fact that the electrically conductive particles of the carbon black powder cannot be charged in the EPS process. As a consequence, the polymer/carbon black mixture is no longer attracted sufficiently by the grounded metal component, so that at best only very thin and uneconomical layer thicknesses can be formed. In order to produce a satisfactory layer thickness, the proportion of carbon black should therefore be made very low. On the other hand, a proportion of carbon black which is as high as possible is desirable for a sufficient ability to conduct electricity away. This dilemma has hitherto not been able to be solved by the known process, especially for the highly corrosion-resistant and high-melting perfluoroalkoxy polymer (PFA).

The document WO 2014/012161 A1 discloses a process for coating components suitable for heat transfer, in particular shell-and-tube heat exchangers, with a mixture of fluoropolymers and additives which increase the thermal conductivity and the electrical conductivity. Graphite is disclosed as preferred additive, and the proportion by weight of this in the mixture is from 10% to 60%.

In contrast to the first process, a mixture of pulverulent powder and carbon black particles is not produced in a second known process, but instead a compound of polymer and carbon black is firstly produced in a melting/mixing process and this compound is subsequently milled to a powder. However, this production process is complicated, which is reflected in correspondingly high prices for commercial materials produced by this process. A further disadvantage of this process is that a significantly greater percentage of carbon black is necessary for achieving a sufficient ability to conduct electricity away from layers produced using these powders. However, the increased proportions of carbon black once again have an adverse effect on the melting behavior in the EPS process.

It was an object of the invention to develop fluoropolymer/carbon black powder mixtures as composite material further in such a way that the surface quality of a coating produced from the composite material is improved, the chemical resistance and the long-term stability of the coating is ensured and the ability of the layer to conduct electrostatic charges away is sufficiently high for uses in, for example, coating of sensors which are used in places where there is a risk of explosion. At the same time, the powder mixture should be electrostatically chargeable in order to be able, for example, to be processed in the EPS process and make a stable coating process possible.

This object is achieved according to the present invention by a composite material according to claim 1 and by a process for producing the composite material according to claim 8. Advantageous embodiments of the composite material are indicated in claims 2 to 7. Further subject matter of the invention encompasses components coated with the composite material and a coating process according to claims 9 to 11, and also advantageous uses of the composite material according to claims 12 to 14.

The composite material of the invention comprises perfluoroalkoxy polymer powder, carbon black powder and a film-forming liquid, wherein the proportion by mass of the film-forming liquid is from 0.05% by weight to 1.0% by weight, the film-forming liquid at least partially wets the surfaces of the particles of the perfluoroalkoxy polymer powder, and the particles of the carbon black powder adhere to the film-forming liquid and/or the particles of the perfluoroalkoxy polymer powder.

It has been found that the above-described dilemma associated with composite materials which are known from the prior art and comprise merely polymer powder and carbon black powder was able to be solved by the addition according to the invention of a small amount of film-forming liquid. The film-forming liquid here functions as bonding agent between the perfluoroalkoxy polymer particles and the carbon black particles.

The composite material of the invention appears macroscopically to be homogeneous. However, it has been found that the particles of the perfluoroalkoxy polymer powder comprised therein are not uniformly coated with carbon black but instead also have uncoated places. This makes it possible for the composite material to be charged in an electric field so that the charged particles can be drawn to a grounded metal surface, as is required, for example, for use in the EPS process.

On the other hand, the addition of the film-forming liquid ensures that a sufficient amount of carbon black particles adheres to the perfluoroalkoxy polymer particles for sufficient carbon black particles to be in contact on a surface coated with the composite material to form a percolation network. This ensures that the coating formed on the basis of the composite material of the invention is capable of conducting away electrostatic charges. A surface is considered to be capable of conducting away electrostatic charges if it has a surface resistance of less than 1 gigaohm ($10^9$ ohm). This value corresponds to the limit value for working surfaces according to the industrial standard DIN EN 61340-5-1:2016. The procedure for measuring the surface resistance is indicated in the industrial standard DIN EN 61340-2-3:2016.

The composite material of the invention comprises at least one perfluoroalkoxy polymer powder. The average particle size of the perfluoroalkoxy polymer powder is preferably from 30 to 50 microns. For the purposes of the present invention, the average particle size is the D50 value determined in accordance with the standard ISO 13320:2020.

The perfluoroalkoxy polymer powder has a high melting point of from about 300° C. to 315° C. and a high chemical resistance. It has been found that, compared to the prior art, smaller amounts of carbon black are sufficient to produce a surface composed of a composite material based on a PFA powder which is capable of conducting away electrostatic charges and has a good surface quality.

Carbon black powders have a good electrical conductivity and in the composite material serve, after they have bene applied as coating to a surface, to form a percolation network in order to achieve the ability of the coating to conduct away electrostatic charges.

For the purposes of the invention, “carbon black powders” are powders of pure carbon compounds. In a preferred embodiment, the carbon black powder is selected from the group consisting of pigment blacks, conductive carbon blacks, industrial blacks, carbon-comprising soot and carbon nanotubes. The carbon black powder can be the powder of one carbon black or a mixture of a plurality of different carbon blacks. Furthermore, preference is given to the carbon black powder having a “45 micron sieve residue” in accordance with DIN EN ISO 787-18:1995 of less than 50 ppm.

In a preferred embodiment, the proportion by mass of the carbon black powder is from 1.0% by weight to 5.0% by weight, based on the total composite material.

The film-forming liquid has the ability to wet the particles of the perfluoroalkoxy polymer powder completely or at least partially. In addition, the film-forming liquid provides an adhesive force which allows the particles of the carbon black powder to adhere to the surface of the particles of the perfluoroalkoxy polymer powder. It has been found that the film-forming liquid not only improves the adhesion of the carbon black to the perfluoroalkoxy polymer surface but it also leads to the carbon black being able to agglomerate to form larger structures on the surface of each particle of the perfluoroalkoxy polymer powder. On a microscopic level, individual regions of the particles of the perfluoroalkoxy polymer powder are not coated with carbon black in the composite material of the invention and can therefore be electrostatically charged very easily and thus processed well in the EPS process.

In an advantageous embodiment, the film-forming liquid has a boiling point which is lower than the temperature at which the composite material is melted to form a coating on a surface, so that the film-forming liquid evaporates in the melting process. This promotes the formation of a percolation network of carbon black particles in the coating.

In a preferred embodiment, the film-forming liquid is an organic compound which is liquid at room temperature. This organic compound preferably has a boiling point at atmospheric pressure in the range from 90 degrees Celsius to 270 degrees Celsius.

The film-forming liquid is preferably an unbranched or branched aliphatic hydrocarbon compound having a polar functional group.

The film-forming liquid is particularly preferably an aliphatic C3-C10-alcohol, preferably having a boiling point at atmospheric pressure in the range from 90 degrees Celsius to 270 degrees Celsius.

The film-forming liquid is very particularly preferably octanol or heptanol, in particular 1-octanol or 1-heptanol.

In a preferred embodiment of the composite material of the invention, the film-forming liquid is 1-octanol. In this embodiment, the weight ratio of 1-octanol to the carbon black powder is particularly preferably from 1:15 to 1:10. This value range has been found to be a good compromise between the electrostatic chargeability of the composite material in the EPS process and the handling of the composite material in the spray tool for the EPS process.

In a further preferred embodiment, the composite material comprises at least one additive having a thermal conductivity which is higher than the thermal conductivity of the perfluoroalkoxy polymer. The thermal conductivity of a coating produced from the composite material can also be increased thereby, which can be advantageous for use in, for example, coating of heat exchangers, so that the heat exchanger can be operated more efficiently.

Furthermore, the composite material is preferably pulverulent and free-flowing. This allows easy processing, for example by electrostatic powder spray processes (EPS processes).

The invention further provides a process for producing the composite material of the invention, wherein the particles of the perfluoroalkoxy polymer powder are mixed with the film-forming liquid in a first step and the resulting mixture is mixed with the particles of the carbon black powder in a second step.

This order of mixing has the advantage that the film-forming liquid firstly wets the particles of the perfluoroalkoxy polymer powder before it comes into contact with the carbon black particles. This prevents competition between the perfluoroalkoxy polymer particles and the carbon black particles in respect of the absorption of the film-forming liquid.

In a preferred variant of the process, mixing is carried out in a mixing apparatus, for example in a tumble mixer, on a set of rollers, in a stirred vessel or in a plowshare mixer.

Furthermore, preference is given to mixing taking place under atmospheric pressure conditions in a temperature range from 0° C. to 100° C. Here, the mixing temperature should be below the boiling point of the film-forming liquid.

The invention further provides a component having at least one metallic surface which is at least partly coated with a composite material according to the invention. The layer thickness of the coating is preferably from 50 µm to 1000 µm, particularly preferably from 50 µm to 500 µm.

Furthermore, the surface resistance of the coating on the component is preferably less than 1 gigaohm, so that the coating is able to conduct away electricity. This results in the technical advantages of chemical resistance, a high thermal stability at high temperatures up to close to the melting point of the polymers for these components.

The invention further provides a process for coating the surface of a component with a pulverulent composite material according to the invention, comprising the steps (a) heating of the component surface to a temperature which is from 1° C. higher to 100° C. higher than the melting point of the perfluoroalkoxy polymer,
(b) electrostatic charging of the pulverulent composite material,
(c) spraying of the grounded surface of the component.

In a preferred embodiment of the coating process, the temperature of the surface of the component is cooled at a rate of from 0.01° C./s to 1° C./s, preferably from 0.05° C./s to 0.1° C./s, after formation of a contiguous high-viscosity layer on the surface of the component. This measure prevents a buildup of stresses in the coating and potential damage to the layer associated therewith.

The invention further provides a process for producing a film, comprising the steps (a) application of composite material according to the invention to a surface,
(b) heating of the surface to a temperature which is from 1° C. higher to 100° C. higher than the melting point of the perfluoroalkoxy polymer,
(c) cooling and curing of the film layer,
(d) pulling-off of the film from the surface.

The surface is preferably a wall or a plate. The surface is particularly preferably smooth, for example polished. The surface can have been pretreated, for example by application of a release agent to the surface.

In an alternative process for producing a film, composite material according to the invention is introduced into a hot press or heated belt press in order to produce films capable of conducting away electricity therein by heating and pressing.

The invention further provides a process for producing a component by the rotational molding process, comprising the steps (a) introduction of pulverulent composite material according to the invention into a heatable cavity,
(b) heating of the surfaces of the cavity to a temperature which is from 1° C. higher to 100° C. higher than the melting point of the perfluoroalkoxy polymer,
(c) cooling and curing of the filling,
(d) removal of the filling, which represents the component.

The invention further provides a process for producing a molding, comprising the steps (a) introduction of pulverulent composite material according to the invention between at least two heatable tool parts,
(b) heating of the tool parts to a temperature which is from 1° C. higher to 50° C. higher than the melting point of the perfluoroalkoxy polymer and pressing of the composite material to give a molding,
(c) cooling and curing of the molding,
(d) removal of the molding from the mold.

The heating of the tool parts can be carried out before, during and/or after introduction of the composite material.

The subject matter of the invention will be illustrated below with the aid of working examples.

FIG. 1: PFA powder/carbon black mixture with and without film-forming liquid

EXAMPLE 1

To produce a composite material according to the invention, 100 gram of a perfluoroalkoxy polymer (Chemours 532 G-5010 PFA Powder Clear) in powder form having an average particle size of about 43 µm, and having a melting point of 305° C. were mixed in a first step with 0.2 gram of liquid 1-octanol as film-forming liquid at room temperature for 20 minutes on a set of rollers. Here, the surfaces of the particles of the perfluoroalkoxy polymer powder were predominantly wetted by the film-forming liquid. In a second step, 3 gram of conductive carbon black (Orion Printex L) in powder form having a sieve residue value "45 microns in accordance with DIN ISO 787-18" of 12 ppm were subsequently added to the mixture obtained and mixed for a further 10 minutes at room temperature on the set of rollers. The particles of the carbon black powder adhered in agglomerate form to the film-forming liquid and/or the particles of the perfluoroalkoxy polymer powder.

The free-flowing composite material obtained in this way was used to coat a metal surface by the EPS process. For this purpose, the metal part was heated to 330° C. in an oven. After taking the heated metal part from the oven, it was electrically grounded. The composite material was subsequently sprayed by means of a spray gun "Opti Flex" from Gema Switzerland GmbH (St. Gallen, Switzerland, www.gemapowdercoating.com), in which it was electrostatically charged, onto the hot surface, and the metal part was then heated further in the oven where it melted to give a contiguous layer. This cycle of spraying outside the oven and melting in the oven was repeated twice more.

After cooling of the coated metal surface, the layer thickness and the electrical surface resistance at room temperature were determined. The layer thickness was on average 150 microns, measured using a layer thickness measuring instrument Dualscope MP4C from Helmut Fischer GmbH, 71069 Sindelfingen. Here and in the following, "on average" means that the layer thickness was measured at at least three randomly chosen places on the coating and the arithmetic mean was formed from the measured values obtained. The electrical surface resistance was in the range from 1 to 100 megaohm, measured using the Tera Ohmmeter TOM TF600, two-point electrode model 840 from Keinath Electronic GmbH, 72810 Gomaringen.

COMPARATIVE EXAMPLE 1A

A composite material according to the prior art without film-forming liquid was produced by a method analogous to that for the inventive composite material of example 1. For this purpose, 97 gram of the perfluoroalkoxy polymer (Chemours 532 G-5010 PFA Powder Clear) in powder form were mixed with 3 gram of conductive carbon black (Orion Printex L) in powder form having a sieve residue value "45 microns in accordance with DIN ISO 787-18" of 12 ppm. This mixture could be electrostatically charged to only a small extent, if at all, in the EPS spray gun. The corresponding coating experiment using 97% by weight of PFA powder and 3% by weight of conductive carbon black Printex L failed; no layer could be produced on the metal surface.

FIG. 1 shows, in the left-hand half of the FIGURE, which is annotated with "PFA 5010 without additive", a micrograph of the powder mixture of comparative example 1a. The right-hand half of the FIGURE, which is annotated with "PFA 5010 with additive", depicts a micrograph of the pulverulent composite material according to the invention as per example 1. The scale bar is 10 microns and is in each case shown in the right-hand lower corner. Comparison of the two halves of the FIGURE shows a significantly darker coloration of the particles as per the prior art. The PFA particles are virtually completely and uniformly coated with a layer of carbon black, which makes electrostatic charging in an EPS spray gun very difficult or impossible. In contrast, both carbon black agglomerates as black points and also largely carbon black-free regions can be seen in the particles of the composite material according to the invention. These particles according to the invention could be electrostatically charged very well in the EPS spray gun and led to a good layer buildup on the metal surface and at the same time to a layer capable of conducting away electrostatic charges on the metal component.

COMPARATIVE EXAMPLE 1B

In a further coating experiment, 100% PFA powder was applied to the metal surface in the three coating cycles. The layer thickness was on average 200 μm. The surface resistance was more than 2 teraohm. This layer is thus not capable of conducting away electrostatic charges.

EXAMPLE 2

Using experimental conditions and ratios of amounts analogous to those in example 1, 1,4-butanediol was used instead of 1-octanol as film-forming liquid. The layer thickness of the coating on the metallic surface was on average 100 microns. The electrical surface resistance was in the region of 1 gigaohm.

EXAMPLE 3

Using experimental conditions and ratios of amounts analogous to those in example 1, 1-heptanol was used instead of 1-octanol as film-forming liquid. The layer thickness of the coating on the metallic surface was on average 120 microns. The electrical surface resistance was in the range from 100 to 500 megaohm.

EXAMPLE 4

Using the experimental conditions of example 1, the color black "Orion Printex 90" from Orion Engineered Carbons GmbH, Cologne, was used instead of the conductive carbon black "Printex L". The ratios of amounts were: 100 gram of the perfluoroalkoxy polymer Chemours 532 G-5010 PFA Powder Clear, 0.6 gram of 1-octanol, 3 gram of color black "Orion Printex 90". The layer thickness of the coating on the metallic surface was on average 150 microns. The electrical surface resistance was in the region of 100 megaohm.

EXAMPLE 5

In a metal bucket with lid, a polyethylene bag was filled with 10 kg of Chemours 532 G-5010 PFA Powder Clear and 20 g of 1-octanol and closed. The lid of the bucket was subsequently closed and the contents were mixed in a standard tumble mixer for 20 minutes at 20 degrees Celsius. The lid of the bucket and then the PE bag were subsequently opened and 300 g of conductive carbon black "Orion Printex L" were added. Subsequently, first the PE bag and then the bucket were closed and the contents were mixed for a further 20 minutes at 20 degrees Celsius in the tumble mixer. A layer thickness of the layer capable of conducting away electricity of on average 150 microns at a surface resistance of from 1 to 10 megaohm could be achieved for this formulation in three spray cycles as per example 1 when using this mixing process according to the invention.

EXAMPLE 6

A sensor housing having a flange and a cylindrical tube was coated in four spray cycles as per example 1 with the mixture according to the invention as per example 5. After the last spray cycle, the sensor housing was cooled from 335° C. to 220° C. over a period of 30 minutes in the oven. After cooling to a temperature of 220° C., which is significantly below the melting point of the perfluoroalkoxy polymer, further cooling was effected by taking the coated sensor housing from the oven and cooling to room temperature. After cooling to room temperature, a layer thickness of on average 200 microns and an electrical surface resistance of from 1 to 10 megaohm were measured. The measurement of the surface resistance on the coated sensor housing was carried out by means of a teraohm meter from Keinath Electronic GmbH in accordance with the standard DIN EN 61340-2-3:2016.

The invention claimed is:

1. A composite material comprising perfluoroalkoxy polymer powder, carbon black powder and a film-forming liquid, wherein the proportion by mass of the film-forming liquid is from 0.05% by weight to 1.0% by weight, the film-forming liquid at least partially wets the surfaces of the particles of the perfluoroalkoxy polymer powder, the particles of the carbon black powder adhere to the film-forming liquid and/or the particles of the perfluoroalkoxy polymer powder, and wherein the film-forming liquid is an aliphatic $C_3$-$C_{10}$ alcohol-functional group.

2. The composite material according to claim 1, wherein the film-forming liquid is an unbranched or branched aliphatic hydrocarbon compound having a polar functional group.

3. The composite material according to claim 2, wherein the film-forming liquid is 1-octanol.

4. The composite material according to claim 1, wherein the carbon black powder is selected from the group consisting of pigment blacks, conductive carbon blacks, industrial blacks, carbon-comprising soot and carbon nanotubes.

5. The composite material according to claim 1, wherein the proportion by mass of the carbon black powder is from 1.0% by weight to 5.0% by weight.

6. The composite material according to claim 1, wherein the composite material further comprises at least one additive having a thermal conductivity higher than the thermal conductivity of the perfluoroalkoxy polymer.

7. The composite material according to claim 1, wherein the composite material is pulverulent and free-flowing.

8. A process for producing a composite material according to claim 1, wherein the particles of the perfluoroalkoxy polymer powder are mixed with the film-forming liquid in a first step and the resulting mixture is mixed with the particles of the carbon black powder in a second step.

9. A component having at least one metallic surface which is at least partly coated with a composite material according to claim 1.

10. The component according to claim 9, wherein the surface resistance of the coating of the component is less than 1 gigaohm.

11. A process for coating the surface of a component with a pulverulent composite material according to claim 1, comprising (a) heating a component surface to a temperature which is from 1° C. higher to 100° C. higher than the melting point of the perfluoroalkoxy polymer, (b) electrostatically charging the pulverulent composite material, and (c) spraying a grounded surface of the component.

12. A process for producing a film, comprising (a) applying the composite material according to claim 1 to a surface, (b) heating the surface to a temperature which is from 1° C. higher to 100° C. higher than the melting point of the perfluoroalkoxy polymer, (c) cooling and curing a film layer, and (d) pulling-off the film from the surface.

13. A process for producing a component by the rotational molding process, comprising (a) introducing the pulverulent composite material according to claim 1 into a heatable cavity, (b) heating surfaces of the cavity to a temperature which is from 1° C. higher to 100° C. higher than the melting point of the perfluoroalkoxy polymer, (c) cooling and curing the filling, and (d) removing the filling, which represents the component.

14. A process for producing a molding, comprising (a) introducing the pulverulent composite material according to claim 1 between at least two heatable tool parts, (b) heating the tool parts to a temperature which is from 1° C. higher to 50° C. higher than the melting point of the perfluoroalkoxy polymer and pressing of the composite material to give a molding, (c) cooling and curing the molding, and (d) removing the molding from the mold.

15. The composite material according to claim 1, wherein the film-forming liquid is octanol or heptanol.

* * * * *